United States Patent [19]

Jourquin et al.

[11] 4,025,466
[45] May 24, 1977

[54] PROCESS FOR PREPARING POLYURETHANE FOAM AND FOAM SO OBTAINED

[75] Inventors: Lucien Jourquin, Wetteren; Eddie Du Prez, Zottegem, both of Belgium

[73] Assignee: S.A. PRB, Brussels, Belgium

[22] Filed: Oct. 3, 1974

[21] Appl. No.: 511,826

[30] Foreign Application Priority Data

Oct. 3, 1973    Luxembourg ............... 68552

[52] U.S. Cl. ............... 260/2.5 AC; 260/2.5 AW; 260/2.5 AT
[51] Int. Cl.² .............. C08G 18/20; C08G 18/22; C08G 18/75; C08G 18/73
[58] Field of Search ........... 260/2.5 AC, 77.5 AC, 260/75 NC, 2.5 AW, 2.5 AT

[56] References Cited

UNITED STATES PATENTS

| | | | |
|---|---|---|---|
| 3,108,975 | 10/1963 | Lambert | 260/2.5 AC |
| 3,152,094 | 10/1964 | Erner | 260/2.5 AC |
| 3,215,645 | 11/1965 | Flynn | 260/2.5 AC |
| 3,238,154 | 3/1966 | Mosso | 260/2.5 AC |
| 3,467,660 | 9/1969 | Beitchman | 260/77.5 AC |
| 3,621,020 | 11/1971 | Ojakaar | 260/2.5 AC |
| 3,645,924 | 2/1972 | Fogiel | 260/2.5 AC |
| 3,674,721 | 7/1972 | Aufdermarsh | 260/75 NC |
| 3,769,244 | 10/1973 | Hashimoto | 260/2.5 AC |
| 3,803,064 | 4/1974 | Fishbein | 260/2.5 BG |
| 3,814,707 | 6/1974 | Möller | 260/2.5 AC |

FOREIGN PATENTS OR APPLICATIONS

| | | | |
|---|---|---|---|
| 1,146,661 | 3/1969 | United Kingdom | 260/2.5 AW |
| 908,337 | 10/1962 | United Kingdom | 260/2.5 AW |

*Primary Examiner*—C. Warren Ivy
*Attorney, Agent, or Firm*—Sughrue, Rothwell, Mion, Zinn & Macpeak

[57] ABSTRACT

A process for preparing polyurethane foam which consists in introducing in the reaction, between a polyisocyanate and a polyol, a catalyst containing the chemical structure $>N-C=N-$ and also a compound selected from the group comprising metal salts of carboxylic acids having the structure

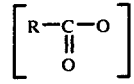

M and metal alcoholates and/or phenolates having the structure M'OR', wherein M' represents an alkaline metal, M represents an alkaline or alkaline-earth metal, R represents hydrogen or an organic radical and R' represents an organic radical.

13 Claims, No Drawings

PROCESS FOR PREPARING POLYURETHANE FOAM AND FOAM SO OBTAINED

This invention relates to a process for preparing a polyurethane foam wherein a polyisocyanate is reacted with a polyol in the presence of water, of foam stabilizers and eventually of various additives, such as additional swelling agents, antioxidants, pigments and the like.

One of the objects of the invention is to provide a process which, by addition of two distinct substances having however a synergistic effect on one another to said reaction, allows to substantially increase the rate of this reaction and to substantially improve the properties of the foam so obtained in comparison with foams made by processes which are known in the preparation of polyurethane foams.

To this end, according to the invention, one uses in this reaction a catalyst comprising the chemical structure:

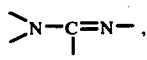

and a compound selected from the group comprising metal salts of carboxylic acids having the structure

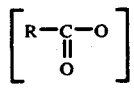

M and metal alcoholates and/or phenolates having the structure M' Or', wherein R represents hydrogen, an alkyl $(C_1 - C_{20})$, alkenyl $(C_2 - C_{20})$ or alkynyl $(C_2 - C_{20})$ radical, these radicals being linear or ramified, eventually substituted by a carboxy group or by one or more halogens, a cycloalkyl $(C_3 - C_6)$ radical which is unsubstituted or substituted by a carboxy group, by one or more alkyl $(C_1 - C_6)$, alkenyl $(C_2 - C_6)$ or alkynyl $(C_2 - C_6)$ groups, which are linear or ramified, an aryl radical, unsubstituted or substituted by one or more halogens, by one or more alkyl $(C_1 - C_8)$, alkenyl $(C_2 - C_8)$ or alkynyl $(C_2 - C_8)$ groups, which are linear or ramified, by an aryl group or by a carboxyl group; R' represent an alkyl $(C_1 - C_{20})$, alkenyl $(C_2 - C_{20})$ or alkynyl $(C_2 - C_{20})$ radical, linear or ramified, which is unsubstituted or substituted by an aryl group or one or more halogens, a cycloalkyl $(C_3 - C_6)$ radical which is unsubstituted or substituted by one or more linear or ramified alkyl $(C_1 - C_6)$, alkenyl $(C_2 - C_6)$, alkynyl $(C_2 - C_6)$ groups, or an aryl radical, which is unsubstituted or substituted by one or more linear or ramified alkyl $(C_1 - C_{20})$, alkenyl $(C_2 - C_{20})$, alkynyl $(C_2 - C_{20})$ groups, by one or more aryl groups or by one or more halogens or hydroxyl radicals, M represents an alkaline or alkaline-earth metal and M' is an alkaline metal.

According to a preferred embodiment, the process according to the invention consists of mixing in only one operation the polyol, polyisocyanate, catalyst, metal salt and/or alcoholate and/or phenolate, a foam stabilizer and one or more substances causing the blowing reaction to be developed so as to form polyurethane foam in only one stage.

Other details and particularities of the invention will become apparent from the description of some embodiments of the invention, given hereinafter by way of non limitative examples.

The process according to the invention consists of using, so as to increase the reaction rate between the polyol and the polyisocyanate, without altering the properties of the foam so obtained, a catalyst comprising in its formula the structure

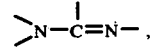

on which four radicals are ramified, which are inactive for the present invention, such as hydrocarbon radicals, and a metal salt or a mixture of metal salts of carboxylic acids having the general formula

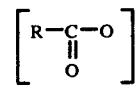

M or metal alcoholates and/or phenolates having the structure M'OR' in which R represents hydrogen, an alkyl $(C_1 - C_{20})$, alkenyl $(C_2 - C_{20})$ or alkynyl $(C_2 - C_{20})$ radical, said radicals being linear or ramified, eventually substituted by a carboxy group or by one or more halogens, a cycloakyl $(C_3 - C_6)$ radical which is unsubstituted or substituted by a carboxy group, by one or more alkyl $(C_1 - C_6)$, alkenyl $(C_2 - C_6)$ or alkynyl $(C_2 - C_6)$ groups, which are linear or ramified, an aryl radical which is unsubstituted or substituted by one or more halogens, by one or more alkyl $(C_1 - C_8)$, alkenyl $(C_2 - C_8)$ or alkynyl $(C_2 - C_8)$ groups, which are linear or ramified, by an aryl group or by a carboxy group; R' represents a linear or ramified alkyl $(C_1 - C_{20})$, alkenyl $(C_2 - C_{20})$, alkynyl $(C_2 - C_{20})$, radical which is unsubstituted or substituted by an aryl group or by one or more halogens, a cycloalkyl $(C_3 - C_6)$ radical which is unsubstituted or substituted by one or more alkyl $(C_1 - C_6)$, alkenyl $(C_2 - C_6)$, alkynyl $(C_2 - C_6)$ groups, which are linear or ramified, or an aryl radical which is unsubstituted or substituted by one or more linear or ramified alkyl $(C_1 - C_{20})$, alkenyl $(C_2 - C_{20})$, alkynyl $(C_2 - C_{20})$ groups, by one or more aryl groups or by one or more halogens or hydroxyl groups, M represents an alkaline or alkaline-earth metal and M' is an alkaline metal.

Although these metal catalysts, salts and alcoholates and phenolates can be used in the reaction of polyols and polyurethanes of any kind, they are particularly important according to the invention in the preparation of polyurethane foams based on not very reactive polyisocyanates, namely aliphatic and alicyclic polyisocyanates, said foams having a good stability with respect to light and oxygen by suffering substantially no color change under the influence of light and oxygen while keeping their initial physical properties.

There exists some processes for preparing polyurethane foams which present these stability properties in a more or less important extent.

However till now, it has not yet been possible to prepare such a stable foam by the known per se process, so-called "one-shot" process, according to which all the necessary ingredients for forming foam are reacted together at the same time.

Concerning known light- and oxygen - resisting polyurethane foams, which are obtained from ester or other polyols, the working characteristics are rather unfavourable in the sense that the margin between a too open foam, in which slits form and which collapse after free rise, and a too closed foam, also called dead foam, is too narrow, that the ratio between the cream time and the reaction time is not ideal and has as a consequence to create deficiencies in the foam due to a bad curve of foam rise, that variations develop in a same foam block in regard to air permeability and cellular structure, and finally that the foam characteristics are reproducible with difficulty.

These various drawbacks are more particularly evident when passing from laboratory scale to industrial scale.

By the use according to the invention of said combination of the catalyst containing the structure

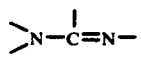

and of said metal salt and/or alcoholate and/or phenolate, it has been possible to remedy these drawbacks.

It has been found that catalysts comprising this chemical structure act in a sufficiently active manner as well in the blowing reaction as in the polymerisation reaction.

The catalysts which are particularly suitable in this regard are those having the structure:

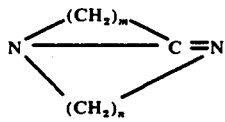

wherein $m$ and $n$ are integers and can have the values of 3 to 7 and 2 to 4 respectively, as well as salts thereof, more particularly salts of acetic acid, phenol and fumaric acid, and guanidine derivatives having the following general formula:

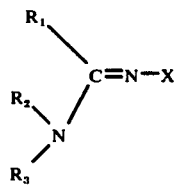

wherein $R_1$ is an alkyl ($C_1 - C_{20}$) radical or a group

in which $R_4$ and/or $R_5$ are hydrogen or alkyl ($C_1 - C_3$) radicals which are identical or different; $R_2$ and/or $R_3$ represent hydrogen or identical or different alkyl ($C_1 - C_3$) radicals, and X represents hydrogen, an alkyl ($C_1 - C_{20}$) radical, a cycloalkyl radical, an aryl radical, eventually substituted by one or more halogens, by one or more alkyl ($C_1 - C_8$), alkenyl ($C_2 - C_8$), alkynyl ($C_2 - C_8$) groups, which are linear or ramified, by an aryl group or by a carboxyl group, as well as salts of these amino compounds with light acids, such as carbonic acid, phenol, benzoic acid.

Amongst these guanidine derivative, a preference has been given to those wherein $R_1$ represents the group

in which $R_4$ and $R_5$ are identical or different alkyl ($C_1 - C_3$) radicals; $R_2$ and $R_3$ are identical or different alkyl ($C_1 - C_3$) radicals, and X is hydrogen, a methyl, decyl, dodecyl or phenyl radical, as well as salts or these compounds with light acids, such as carbonic acid, phenol, benzoic acid, in which $R_2$, $R_3$, $R_4$ and $R_5$ can be hydrogen in addition to the previously mentioned meanings.

The amounts of these catalysts to be used vary between 0.1 and 10 parts by weight with respect to 100 parts by weight of polyol, preferably between 0.5 and 3 parts by weight.

In combination with these special catalysts, according to the invention, one can also use conventional amine catalysts which are used in the preparation of polyurethane foams, such as tetramethylethylenediamine, triethylenediamine, dimethylaminoethanol, bis (dimethylaminoethyl)ether, N-ethylmorpholine, N, N'-dimethylpiperazine, triethylamine, dimethylcyclohexylamine.

Although said special catalysts already allow as a rule to apply the so-called "one-shot" process, the rather unfavourable working conditions persist due to a not very interesting catalytic balance.

Unexpectedly it has been found according to the invention that it is possible to remedy these last drawbacks by using said metal salts and/or alcoholates or phenolates as reaction moderators which result in substantially improving the catalytic balance in the blowing and polymerization reactions thanks to their accelerating effect on the cream time on the one hand, and their moderating effect on the free rise time and the gelation time on the other hand.

These metal salts, alcoholates and phenolates have moreover a very particular effect on the foam formation. As a matter of fact, they also favour the trimerisation reaction of polyisocyanates according to which additional isocyanurate cross-linking bondings develop in the foam. This has as a consequence that as well the thermal stability as the hardness of foams are increased.

The used amount and kind of metal compound can have a substantial influence on the hardness of the foam so obtained, as it will besides result from the preparation examples given hereinafter.

Amongst metal salts and alcoholates and phenolates, those wherein in their general formulas M and M' represent lithium, potassium and sodium, R represents hydrogen or a methyl radical and R' represents a methyl radical or a substituted or not phenyl radical, such as lithium, potassium and sodium acetate or formate, sodium and potassium phenolate and methoxide are particularly suitable.

Other typical examples are metal salts (wherein M = Li, Na, K, Ca), such as propionate, α-halopropionates, butyrate, 2-ethylhexanoate, benzoate, α-halobenzoates, α-cyclohexylformate, phthalate, tartarate, oxalate, adipate, oleate, α-haloacetates and the like, and Li, K or Na alcoholates (or phenolates) of methanol, ethanol, t-butanol, cyclohexaol, 4-methylcyclohexanol, o-, m- and p-cresol, 4-t-butyl pyrocatechol, pentachlorophenol, 3.4-dimethyl -6-t-butylphenol, β-naphthol and the like.

The amounts used are 0.05 to 5 parts by weight per 100 parts by weight of polyol and preferably 0.2 to 3 parts.

In addition to already hereinabove cited ingredients, one uses in the preparation of polyurethane foams, foam stabilizers, preferably silicone oils, water to cause the blowing reaction, and eventually other blowing agents, preferably low boiling chlorinated hydrocarbons, such as Freon 11 or methylene chloride, antioxidants and/or ultraviolet-ray absorbers, typical metal catalysts for manufacture of polyurethane foams, such as tin octoate, tin dibutyl dilaurate, lead 2-ethylhexanoate, as well as other additives, such as pigments, fillers, plastifiers and the like.

The examples given hereinafter allow to illustrate some features of the process according to the invention.

EXAMPLE I

A mixture of the following ingredients is reacted in only one operation according to the so-called "one-shot" process, the amounts being given in parts by weight. - D 2200 (Bayer), which is the trade name of an ester polyol the OH number of which equals to 56 and which is the slightly cross-linked reaction product of adipic acid, diethylene glycol and

| | |
|---|---|
| Trimethylolpropane | 100 |
| β-isocyanatomethyl-3.5.5-trimethylcyclohexyl isocyanate (NCO index = 105) | 64 |
| Water | 4 |
| Silicone L 532 (Union Carbide) | 1 |
| 1.8-diazabicyclo-5.4.0-undecene-5 | 0.9 |
| Tetramethylguanidine | 1.5 |
| Sodium formate | 1.0 |

The cream time is 10 sec., while the reaction time is 70 sec.

The specific gravity of the foam is 27 kg/m³.

EXAMPLE II

A mixture of the following ingredients is reacted in only one operation according to the so-called "one-shot" process:

| | |
|---|---|
| Fomrez 50 (Witco chemicals), which is a polyol similar to D 2200 of Example 1 | 100 |
| Bis [4-isocyanats-cyclohexyl] methane (NCO index = 100) | 58 |
| Water | 3.5 |
| Silicone B 2008 (Goldschmidt) | 1.2 |
| 1.8-diazabicyclo-5.4.0-undecene-5 | 1.5 |
| 3.9-di-iso-decyloxy-2.4.8.10-tetra-oxa-3.9-diphospha-spiro-5.5-undercane | 4.0 |
| Tris (phenyl)phosphite | 2.0 |

By starting from this basic composition, the sodium salts of the following acids were used as catalysts according to the invention:

| Sodium salt of acid: | Amount, parts | Creaming time, sec. | Reaction time, sec. |
|---|---|---|---|
| a) oleic | 2 | 20 | 70 |
| b) linolenic | 3 | 24 | 85 |
| c) 2.3 dimethylbenzoic | 1.5 | 19 | 68 |
| d) adipic | 2 | 17 | 72 |
| e) 2.4-dichlorobenzoic | 1 | 20 | 80 |

The specific gravity of the foam so obtained varies between 29 and 34 kg/m³.

EXAMPLE III

A mixture of the following ingredients is reacted in only one operation, according to the so-called "one-shot" process:

| | |
|---|---|
| D 2200 (Bayer) | 100 |
| 50% 3-iso-cyanatomethyl-3.5.5-trimethylcyclohexylisocyanate (NCO index = 100) 50% bis (4-isocyanato-cyclohexyl) methane | 65.3 |
| Silicone B 2978 (Goldschmidt) | 1 |
| Water | 4 |
| 1.8-diazabicyclo-5.3.0-decene-7 | 0.8 |
| bis (dimethylaminoethyl)ether | 1.0 |
| Sodium phenolate | 1.5 |

The swelling time is 12 sec., while the reaction time is 77 sec.

The specific gravity of the foam so obtained is 28 kg/m³.

EXAMPLE IV

A prepolymer is prepared from 20 parts by weight of D 2200 and 80 parts by weight of 3-isocyanatomethyl-3.5.5-trimethylcyclohexylisocyanate at room temperature with 0.3 part of lead 2-ethylhexanoate as catalyst.

The reaction is completed within ± 5 minutes and a prepolymer having a viscosity of 190 cps/25° C and 28.72% of NCO is obtained.

85 parts of this prepolymer are then reacted with the following ingredients, so as to obtain the formation of the foam:

| | |
|---|---|
| isocyanate (NCO = 105) | |
| D 2200 (Bayer) | 100 |
| Water | 4 |
| Silicone DC 195 (Dow Corning) | 1 |
| 1.5-diazabicyclo-4.3-nonene-5 | 1.2 |
| Cyclohexyltetramethylguanidine | 0.8 |
| X-ray absorber | 0.2 |

These ingredients are thoroughly mixed together for about 10 sec.

The swelling time is 12 sec., while the reaction time is 70 sec.

The polyurethane foam so obtained has a specific gravity of 31.7 kg/m³.

EXAMPLE V

This example has for its object to demonstrate the influence of the metal salt amount used on the physical properties and more particularly the hardness of the foam so obtained.

In this respect, a mixture of the following ingredients is reacted:

| | |
|---|---|
| Fomrez 50 (Witco) | 100 |
| 3-isocyanatomethyl-3.5.5-trimethylcyclohexyl-isocyanate (NCO index = 100) | 62.6 |
| Water | 3.6 |
| 1.8-diazabicyclo-5.3.0-decene-7 | 1.5 |
| Tris (dipropylene glycol) | 8 |
| Silicone DC 193 (Union Carbide) | 1.2 |
| Potassium acetate | 1 |

The reaction time is 70 sec.

Then, one starts from the same ingredients with the same ratios, at the exception of potassium acetate of which 2% are added instead of 1%.

The reaction time is 55 sec. in this case.

The physical properties of these two foams are compared hereinafter.

|  | Reaction with 1% of potassium acetate | Reaction with 2% of potassium acetate |
|---|---|---|
| Specific gravity, kg/m³ | 30.1 | 31.1 |
| ILD in kg at 25% (1) | 8 | 13.5 |
| 40% | 12 | 19 |
| 50% | 14 | 22 |
| 65% | 18 | 30 |
| CDH in g/cm² at 25% (2) | 9.5 | 14.5 |
| 40% | 12 | 18 |
| 60% | 20 | 28 |
| Elongation at rupture in % (3) | 143 | 120 |
| Tensile strength, kg/cm² | 0.43 | 0.55 |
| Tearing strength, kg/cm (3) | 0.24 | 0.35 |
| Elasticity, % (3) | 29 | 34 |
| Compression set, %-21° C- 72 hrs, 50% compression (DIN 53572) | 62.7 | 45.9 |

(1) means an universal method able to measure the material hardness (identation load deflection according to ASTM D1564 - 64 T specifications, method A)
(2) concerns a method for measuring the pressure resistance (compression deflection hysteresis) according to specifications DIN 53577
(3) according to specifications ASTM D 1564 - 64 T.

EXAMPLE VI

A mixture of the following ingredients is reacted in only one operation according to the so-called "one-shot" process

| Fomrez 52 (Witco) (polyester polyol similar to Fomrez 50) | 100 |
|---|---|
| 3-isocyanatomethyl-3.5.5-trimethylcyclohexyl-isocyanate (NCO index = 100) | 62.6 |
| Water | 3.6 |
| 1.8-diazabicyclo-5.4.0-undecene-5-phenolate | 1.7 |
| Sodium β-chloroacetate | 2.0 |
| Silicone L 532 (U.C.) | 1.5 |
| Triphenyl phosphite | 3 |

The creaming time is 20 sec., while the reaction time is 69 sec.

The specific gravity of the foam so obtained is 32 kg/m³.

EXAMPLE VII

A mixture of following ingredients is reacted in only one operation according to the so-called "one-shot" process:

| D 2200 | 100 |
|---|---|
| Bis (4-isocyanato-cyclohexyl) methane | 50 |
| Water | 3 |
| 1.5-diazabicyclo-4.3.0-nonene-5 | 1 |
| Tetramethylguanidine | 2 |
| Sodium para-bromobenzoate | 0.7 |
| Potassium salicylate | 0.7 |
| Silicone DC 195 (Dow Corning) | 1.2 |
| Diphenyloctylphosphite | 2 |
| X-ray absorber | 0.2 |

The creaming time is 2 to 3 seconds and the reaction time is 65 sec.

The specific gravity of the foam so obtained is 37 kg/m³.

EXAMPLE VIII 100 parts of Desmophene 3900 (active polyethertriol of Bayer, hydroxyl number of 37) are reacted with 59.3 parts of bis (4-isocyanato-cyclohexyl) methane at room temperature and in the presence of 0.3 parts of zinc 2-ethylhexoate as catalyst, so as to form a "prepolymer" containing 11.4% of free NCO radicals and having a viscosity (20°) of 2545 centipoises.

100 parts of this prepolymer are reacted with 3.2 parts of water, 0.8 parts of tetramethylguanidine, 0.8 parts of guanidine phenolate, 1 parts of polydimethylsiloxane DC 200 Dow Corning), 1 parts of sodium phenolate, 3 parts of triphenylphosphite, 3 parts of trisisodecylphosphite and 0.2 parts of a ultraviolet-ray absorber.

The creaming time is 25 sec., while the reaction time is 70 sec. The specific gravity of the foam so obtained is 34 kg/m³.

EXAMPLE IX

A mixture of the following ingredient is reacted, in only one operation, according to the so-called one-shot process:

| Tercarol 555 (active polyethertriol of Carbochimic, hydroxyl number of 35) | 100 |
|---|---|
| 3-Isocyanatomethyl-3.5.5-trimethylcyclohexylisocyanate (NCO index of 105) | 60 |
| Water | 4 |
| 1.8-Diazabicyclo-5.4.0-undecene-5-phenolate | 0.8 |
| N-dodecyl tetramethylguanidine | 1 |
| Sodium salt of benzoic acid | 1 |
| Lead 2-ethylhexoate | 0.2 |
| Silicone L 520 (U.C.) | 0.5 |
| Tridecylphosphite | 3 |
| Ultraviolet ray absorber | 0.2 |

The creaming time is 22 sec., while the reaction time is 61 sec. The specific gravity of the foam so obtained is 39 kg/m³.

All the foams of above-described examples are quite well resistant to the light and oxygen influence and give complete satisfaction in the Xenon test at blue scale 6–7, with respect to degradation resistance.

It is to be understood that the invention is not limited to the embodiments described and that many variants may be considered without departing from the scope of the present patent.

Thus special catalysts combined with above-mentioned salts and/or alcoholates can be applied in any process for preparing polyurethane foam.

We claim:

1. A process for preparing a polyurethane foam comprising reacting in one stage an aliphatic or alicyclic polyisocyanate with a polyol in the presence of water and a catalyst combination comprising:
   a. a compound having the general formula > N —C = N selected from the group consisting of diazabicycloalkene according to formula:

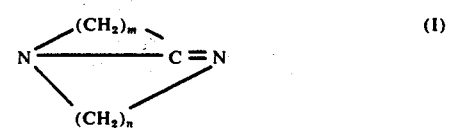

wherein $m$ is an integer of 3 to 7 and $n$ is an integer of 2 to 4, the salts thereof formed with acetic acid, phenol or fumaric acid and the guanidine derivatives having the general formula:

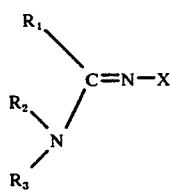

wherein $R_1$ is a $C_1$ to $C_{20}$ alkyl radical or a group

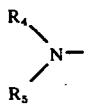

in which $R_4$ and $R_5$ are identical or different and represent hydrogen or a $C_1$ to $C_3$ alkyl radical, $R_2$ and $R_3$ are identical or different and represent hydrogen or $C_1$-$C_3$ alkyl radical; and X represents hydrogen, a $C_1$ to $C_{20}$ alkyl radical, a cycloalkyl radical, or phenyl radical, said $C_1$-$C_{20}$ alkyl, cycloalkyl or phenyl radical being unsubstituted or substituted by one or more halogen atoms, by one or more linear or branched $C_1$ to $C_8$ alkyl groups, $C_2$ to $C_8$ alkenyl groups, or $C_2$ to $C_8$ alkynyl groups, by a phenyl group or by a carboxyl group, and the salts of said guanidine derivatives formed with carbonic acid, phenol or benzoic acid, and b. a compound selected from the group consisting of alkaline or alkaline earth metal salts of carboxylic acids having the structural formula $R-(CO_2H)_x$ wherein $x$ is 1 or 2 and the metal alcoholates and phenolates having the structure $M'\ OR'$, wherein R represents:

hydrogen, a linear or branched $C_1$ to $C_{20}$ alkyl, $C_2$ to $C_{20}$ alkenyl or $C_2$ to $C_{20}$ alkynyl radical, these radicals being unsubstituted or substituted by one or more halogens, A $C_3$ to $C_6$ cycloalkyl radical which is unsubstituted or substituted by one or more $C_1$ to $C_6$ alkyl, $C_2$ to $C_6$ alkenyl or $C_2$ to $C_6$ alkynyl groups, which are linear or branched, a phenyl radical, unsubstituted or substituted by one or more halogens, or by one or more $C_1$ to $C_8$ alkyl, $C_2$ to $C_8$ alkenyl or $C_2$ to $C_8$ alkynyl groups, which are linear or branched, or by a phenyl group;

$R'$ represents a $C_1$ to $C_{20}$ alkyl, $C_2$ $C_{20}$ alkenyl or $C_2$ to $C_{20}$ alkynyl radical, linear or branched, which is unsubstituted or substituted by a phenyl group or by one or more halogens, a $C_3$ to $C_6$ cycloalkyl radical which is unsubstituted or substituted by one or more linear or branched $C_1$ to $C_6$ alkyl, $C_2$ to $C_6$ alkenyl, $C_2$ to $C_6$ alkynyl groups, or a phenyl radical, which is unsubstituted or substituted by one or more linear or branched $C_1$ to $C_{20}$ alkyl, $C_2$ to $C_{20}$ alkenyl, or $C_2$ to $C_{20}$ alkynyl groups, or by one or more phenyl groups or by one or more halogen of hydroxyl radicals, and $M'$ is an alkaline metal.

2. A process as claimed in claim 1 wherein an ester polyol is used as polyol.

3. A process as claimed in claim 1, wherein an ether polyol is used as polyol.

4. A process as claimed in claim 1, wherein in combination with this catalyst, one uses amine catalysts selected from the group comprising tetramethylethylenediamine, triethylenediamine, dimethylaminoethanol, bis (dimethylaminoethyl) ether, N-ethylmorpholine, N,N'-dimethylpiperazine, triethylamine, and dimethylcyclohexylamine.

5. A process as claimed in claim 1, wherein, as metal salts or alcoholates, one uses compounds in which M represents Li, Na or K, R represents hydrogen or a $C_1$-$C_3$ alkyl radical substituted by one or more halogens, $R'$ represents a methyl radical or a phenyl radical which is unsubstituted or substituted by one or more $C_1$-$C_3$ alkyl 6. A process as claimed in claim 5 wherein 0.05 to 5 parts by weight of the metal salt or alcoholate of claim 10 is used per 100 parts by weight of polyol.

7. A process as claimed in claim 5 wherein 0.2 to 3 parts by weight of the metal salt or alcoholate used per 100 parts by weight of polyol.

8. The process of claim 5, wherein said metal salt or alcoholate is lithium, sodium or potassium acetate, sodium formate, sodium phenolate, or sodium methoxide.

9. A process claimed in claim 1, wherein a foam stabilizer and one or more blowing agents are mixed with the other ingredients.

10. Process according to claim 1 wherein a catalyst combination is used comprising:
  a. a compound selected from the group consisting of
    1.8 diazabicyclo-5.4.0 undecene 7,
    1.8 diazabicyclo-5.3.0 decene 7,
    1.5 diazabicyclo-4.3.0 nonene 5,
    1.8 diazabicyclo-5.4.0 undecene 7 phenolate,
    tetramethylguanidine,
    cyclohexyltetramethylguanidine,
    N-dodecyltetramethylguanidine and
    guanidine phenolate and
  b. a compound selected from the group consisting of potassium or sodium salts of oleic acid 2.3 dimethylbenzoic acid, adipic acid, 2–4 dichlorobenzoic acid, benzoic acid, β-chloroacetic acid, p-bromobenzoic acid, salicyclic acid, formic acid, acetic acid and of potassium or sodium phenolate.

11. A process as claimed in claim 1, wherein the guanidine derivatives of the general formula (II), $R_1$ represents the group

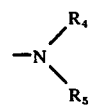

in which $R_4$ and $R_5$ are identical or different $C_1$ to $C_3$ alkyl radicals; $R_2$ and $R_3$ are identical or different $C_1$ to $C_3$ alkyl radicals, and X is hydrogen, a methyl, decyl, dodecyl or phenyl radical, as well as salts of these compounds with carbonic acid or phenol, in which $R_2$, $R_3$ and $R_5$ may also represent hydrogen.

12. A process as claimed in claim 11, wherein 0.1 to 10 parts by weight of the catalyst of claim 17 is used per 100 parts by weight of polyol.

13. A process as claimed in claim 11, wherein 0.5 to 3 parts by weight of the catalyst of claim 17 is used per 100 parts by weight of polyol.

* * * * *